(12) United States Patent
Daures et al.

(10) Patent No.: US 11,418,732 B2
(45) Date of Patent: Aug. 16, 2022

(54) IMAGING METHOD WITH PULSED LIGHT

(71) Applicant: FLUOPTICS, Grenoble (FR)

(72) Inventors: Anthony Daures, Clichy (FR); Philippe Rizo, La Tronche (FR)

(73) Assignee: FLUOPTICS, Grenoble (FR)

( * ) Notice: Subject to any disclaimer, the term of this patent is extended or adjusted under 35 U.S.C. 154(b) by 318 days.

(21) Appl. No.: 16/834,039

(22) Filed: Mar. 30, 2020

(65) Prior Publication Data

US 2020/0322552 A1 Oct. 8, 2020

(30) Foreign Application Priority Data

Apr. 3, 2019 (FR) ...................................... 1903592

(51) Int. Cl.
*H04N 5/353* (2011.01)
*H04N 5/06* (2006.01)

(52) U.S. Cl.
CPC ............. *H04N 5/3532* (2013.01); *H04N 5/06* (2013.01)

(58) Field of Classification Search
CPC ................................ H04N 5/3532; H04N 5/06
See application file for complete search history.

(56) References Cited

U.S. PATENT DOCUMENTS

| | | | |
|---|---|---|---|
| 8,786,720 B2 * | 7/2014 | Oba | G06T 5/50 382/128 |
| 9,307,600 B2 | 4/2016 | Upton | |
| 9,386,236 B2 | 7/2016 | Muller | |
| 10,634,615 B2 * | 4/2020 | Rizo | G01N 21/6456 |
| 2014/0364690 A1 * | 12/2014 | Seto | H04N 5/2256 348/70 |
| 2017/0238791 A1 * | 8/2017 | Kagawa | A61B 1/04 |
| 2017/0295326 A1 | 10/2017 | Eyama | |

OTHER PUBLICATIONS

Hudon et al., "High Speed Sequential Illumination with Electronic Rolling Shutter Cameras," The IEEE Conference on Computer Vision and Pattern Recognition (CVPR) Workshops, 2015, pp. 66-73.
Bradley et al., "Synchronization and Rolling Shutter Compensation for Consumer Video Camera Arrays," 2009 IEEE Computer Society Conference on Computer Vision and Pattern Recognition Workshops, Miami, FL, 2009, pp. 1-8.

* cited by examiner

*Primary Examiner* — Timothy J Henn
*Assistant Examiner* — Fayez A Bhuiyan
(74) *Attorney, Agent, or Firm* — Occhiuti & Rohlicek LLP

(57) ABSTRACT

The invention relates to a method allowing the use of the information accessible by fluorescence imaging to be optimized. For this purpose, it implements the combination of a protocol for calibration and synchronization of a pulsed light for exciting a fluorescent marker, with the operation in "rolling shutter" mode of a fluorescence camera. An appropriate correction factor allows the complete signal integrated by all of the photodiodes of the camera to be used so that no image is lost.

19 Claims, 13 Drawing Sheets

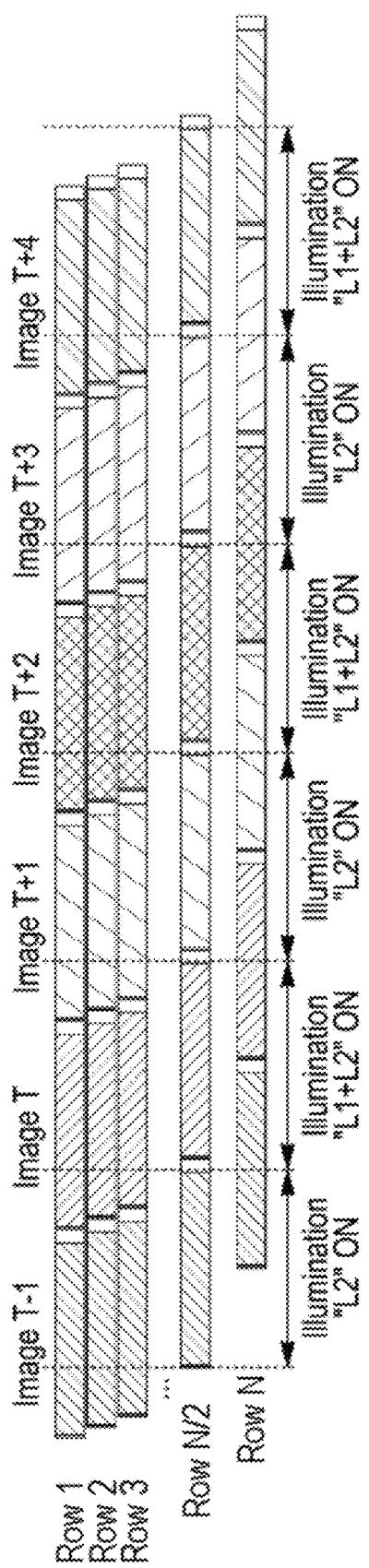

IMAGING METHOD WITH PULSED LIGHT

RELATED APPLICATIONS

Under 35 USC 119, this application claims the benefit of the Apr. 3, 2019 priority date of French application FR 1903592, the contents of which are herein incorporated by reference.

FIELD OF INVENTION

The invention relates to the field of fluorescence imaging and in particular, to fluorescence imaging for medical applications.

BACKGROUND

In fluorescence imaging, it may be desirable to illuminate a region of interest capable of emitting a fluorescent signal with an illumination distinct from the source of excitation used for exciting a fluorescent marker, or fluorophore, source of the fluorescent signal. However, this illumination can interfere with the detection and the measurement of the fluorescent signal by means of a sensor that may be sensitive to the wavelengths corresponding to this signal (this sensor may for example be sensitive to the visible and the infrared wavelengths). For example, the lights of the operating theater (neon, scialytic, etc.), which guarantee a good visibility of the operating space with a very good colorimetry, may also alter the visibility of the fluorescent signal. Notably, indeed, if the lights of the operating theater are not filtered, they produce a radiation in the infrared that is visible by a camera sensitive to the fluorescence. The infrared radiation will be reflected by the biological tissues and will be superimposed on the fluorescence signal actually emitted by the fluorophore.

As a solution to this problem, techniques have been developed that consist of using a pulsed light as a source of excitation of the fluorescence. According to these techniques, a region of interest is continuously illuminated with a light L2 (L2 being the light of the theater, for example) and a light source L1 (fluorescence excitation laser or LED) is made to pulse in order to produce an image obtained with L1+L2, then an image obtained without the illumination by the source L1, hence an image with the constant illumination L2 only. Then, if the scene has not moved too much, it may be considered that it is possible to recover the fluorescence information due solely to the illumination by the source L1 ("image L1") by subtracting the image obtained with L2 only ("image L2") from that obtained with L1 and L2 ("image L1+L2"). It is subsequently possible to display the "image L1" alone or to superimpose the "image L1" onto the "image L2" which, in this case, provides contextual information (which allows a better location guide in the region of interest).

There exist, in particular, two ways of producing the "images L2" and the "images L1+L2" according to this type of technique. Either a sensor operating in "global shutter" mode is used, or a sensor operating in "rolling shutter" mode is used. The use of a "global shutter" avoids (or virtually so) having any deformation of the images if the region of interest and the sensor have moved with respect to each other. On the other hand, it requires a read, row by row, of the signals measured on the photodiodes of the sensor, after all the photodiodes participating in the construction of the image have been exposed. This has the effect of deferring the start of a new acquisition after the end of each read of the signals corresponding to all of the rows. Conversely, the use of a "rolling shutter" allows the exposure of a set of photodiodes to be started, during the read of the signals measured on another set of photodiodes. On the other hand, if the region of interest and the sensor have moved with respect to each other during the entire acquisition, the use of a "rolling shutter" may lead to deformations of the images. Furthermore, with fast light sources (of the stroboscope type for example), some rows may not be completely exposed or the exposure of some rows may be different from that of other rows.

SUMMARY

The invention falls within the framework of the use of a "rolling shutter." One aim of the invention is therefore to supply at least two images, each respectively obtained under different illuminations, while at the same time increasing the quantity of information detectable and measurable by the sensor.

For this purpose, an imaging method is provided whose implementation uses:
- a sensor comprising photodiodes distributed within a matrix of photodiodes,
- recording means, for recording the electrical signal generated by at least one photodiode, this signal being used to define the brightness of a pixel on an image,
- means for closed-loop control of the recording means, for sequentially recording the signal generated by one group of photodiodes of the matrix, before recording the signal generated by another group of photodiodes of the matrix, each of these groups of photodiodes comprising at least one photodiode, the whole set of the groups of photodiodes allowing an image of a region of interest to be reconstructed,
- a first light source and a second light source for illuminating the region of interest,
- means for controlling the activation of the first light source over a first time period and the extinction of the first light source over a second time period, the second time period succeeding the first time period and
- processing means for performing operations on values of signals generated by the photodiodes.

Furthermore, according to this method, for each of the photodiodes of at least one group of photodiodes of the matrix, a second value corresponding to the signal recorded during the second time period for the photodiode in question is subtracted from a first value corresponding to the signal recorded during the first time period for this same photodiode, a correction factor being applied to at least one value from the list comprising the first value, the second value and the result of the subtraction. This correction factor is determined based on calibration measurements during which, on the one hand, at least one image is formed of a surface (advantageously uniform) reflecting, constantly over time, the light emitted by a light source referred to as "calibration source" continuously emitting for at least the entirety of the time of exposure of the sensor and, on the other hand, at least one image of a surface reflecting, constantly over time, the light emitted by this same calibration light source emitting periodically over the first time period, with a period corresponding to the sum of the first and of the second time period.

The calibration light source used for the calibration steps is not necessarily the same as that used to produce the images of the region of interest. For example, the calibration light may be a white light, whereas said first light source used to produce images of the region of interest may be a light emitted in the infrared if it is desired to carry out fluorescence measurements in the region of interest. On the other hand, the calibration light must be emitted in a pulsed fashion with the same frequency as said first light source used to produce images of the region of interest. Similarly, the calibration light must be synchronized in the same way over the period for acquisition of the images as when said first light source is used to produce images of the region of interest. Potentially, the filters used in combination with the sensor are not the same during the calibration steps and during the acquisition of the images of the region of interest.

In this document, the expression "surface reflecting constantly over time" refers to a passive or neutral surface in the sense that it is not a surface emitting or reflecting a fluorescence signal varying over time independently of the manner in which it is illuminated. It is notably not the surface of a tissue into which a fluorescent marker has been injected. It could for example be the surface of a test pattern or of a target composed of an inert material.

Thus, by virtue of this method, it is possible to obtain in a simple and reliable fashion a correction factor which allows the use of the information able to be supplied by each image or each frame to be optimized. By applying this type of correction factor, it is possible to correct the levels of illumination of the images, whereas the signals measured for each of the photodiodes of the matrix of the sensor do not necessarily correspond to the same illumination of the region of interest.

The method according to the invention may comprise one or more of the following features considered independently from one another, or each in combination of one or more others:
  the correction factor depends on the interval of time passed between the recording of the signals generated by a reference group and the recording of the signals generated by the group to which the photodiode in question belongs;
  the calibration measurements are carried out during a step prior to the recording of the signal generated by the photodiodes during said first and second time periods;
  the signal generated by the photodiodes of each group of photodiodes is recorded using a sensor operating in "rolling shutter" mode;
  the correction factor is applied to the result of the subtraction of the second value from the first value or vice versa;
  the second time period immediately succeeds the first time period;
  at least one group of photodiodes is exposed periodically with an exposure time corresponding to a period substantially equal to the first time period;
  at least one group of photodiodes is exposed over the entirety of the first time period, then over the entirety of the second time period, the second time period succeeding the first time period, this group being chosen as a reference group;
  the reference group is chosen in such a manner as to correspond to the middle of the sensor;
  at least one of the first and second time periods corresponds to the cumulation of an exposure time of the photodiodes of a group of photodiodes to at least one of the first and second light sources, of a recording time of the signal acquired by each photodiode of this group and of a time for resetting to zero each of the photodiodes of this group;
  the first time period is equal, in duration, to the second time period;
  at least one group corresponds to a series of photodiodes aligned in the matrix;
  each group corresponds to a row of photodiodes in the matrix and the correction factor $Cr(i, j)$ for the signal obtained from a photodiode situated on the row i and the column j is a function of the type $$Cr(i,j) = (T_{2k}^{Xi\%.L1+100\%.L2}(i,j) - T_{2k+1}^{Yi\%.L1+100\%.L2}(i,j))/T^{100\%.L1}(i,j)$$

where
  $T_{2k}^{Xi\%.L1+100\%.L2}(i,j)$ is the intensity of the measured signal, corresponding to the photodiode of the i-th row and the j-th column, for an image $T_{2k}$, obtained by illuminating the region of interest with a percentage $X_i\%$ of the exposure time to the first light source L1, and 100% of the exposure time to the second light source L2,
  $T_{2k-1}^{Yi\%.L1+100\%.L2}(i,j)$ is the intensity of the measured signal, corresponding to the photodiode of the i-th row and the j-th column, for an image $T_{2k+1}$ obtained by illuminating the region of interest with a percentage $Y_i\%$ of the exposure time to the first light source L1, and 100% of the exposure time to the second light source L2, and
  $T^{100\%.L1}(i,j)$ is the intensity of the signal measured for the photodiode of the i-th row and the j-th column, for an image obtained by illuminating a uniform surface, for the entirety of the exposure time of the sensor with the first light source L1 alone.

The invention also relates to an imaging device notably comprising a camera with a sensor comprising photodiodes sensitive to a range of wavelengths extending at least from 700 to 900 nanometers and having a mode of operation of the "rolling shutter" type, with a refresh frequency, means of illuminating a region of interest with a pulsed light source in order to excite a fluorophore, means of synchronizing the activation and the extinction of the pulsed light source with a sequence for integration of the signal extracted from various groups of photodiodes.

In this device, the means of synchronizing the activation and the extinction of the light source for excitation of the fluorophore drives the excitation light source with an on/off frequency equal to half of the refresh frequency of the camera (the on/off period of the light source for excitation of the fluorophore is equal to twice the exposure time of the camera; the reason is that the light source for excitation of the fluorophore may be turned on over the exposure time of the camera and turned off over this same exposure time of the camera).

Potentially, the device according to the invention comprises means for synchronizing the activation and the extinction of the pulsed light source exciting the fluorophore following a sequence consisting in turning on the pulsed light source at the latest at the start of the period of integration of a group of photodiodes (potentially used as a reference group of photodiodes), and in turning off the pulsed light source at the earliest at the end of the period of integration of this same group of photodiodes, and in reproducing this sequence for this same group of photodiodes with a frequency equal to half of the refresh frequency of the camera.

More generally speaking, the means of synchronizing the activation and the extinction of the light source for excitation of the fluorophore may also shift the activation and the extinction of the light source for excitation of the fluorophore, with respect to the sequences for integration of the signal by the sensor. It then suffices to apply a correction in order to take into account the fact that some photodiodes have been more or less exposed than others.

The invention also relates to a computer program comprising instructions for implementing the method according to the invention.

For the sake of simplification of the explanations and of the diagrams, the invention is explained and described hereinbelow making reference to a sensor comprising photodiodes distributed in a matrix of at least N rows and at least M columns of photodiodes, each of said groups of photodiodes corresponding, by way of example, to one of the N rows.

In any case, irrespective of the distribution of the groups (in rows, in columns, or according to another type of distribution), the whole set of the groups of photodiodes allows an image to be formed.

Other features, aims and advantages of the invention will become apparent upon reading the detailed description that follows, and with regard to the appended drawings, given by way of non-limiting examples and in which:

BRIEF DESCRIPTION OF THE FIGURES

FIG. 5a shows schematically a sequence for integration of the signal extracted from the various rows of a sensor operating in "rolling shutter" mode, synchronized according to the invention with periods of illumination by two types of light sources, used alternately, the first and second periods of illumination being identical;

DETAILED DESCRIPTION

Figure 1:
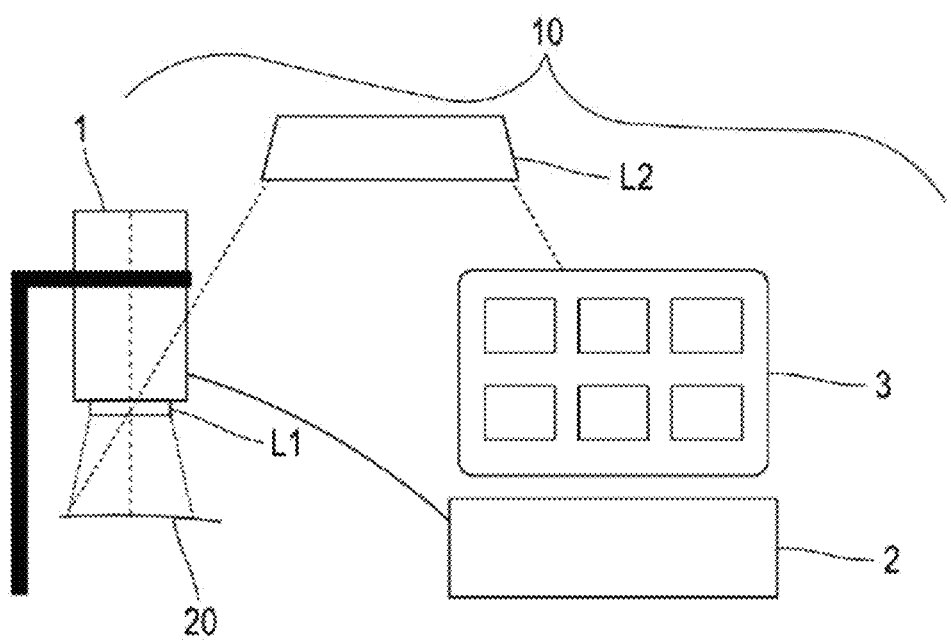
FIG. 1 shows a device for the implementation of a method according to the invention.

One exemplary embodiment of a device 10 for monitoring the fluorescence emitted at the surface of the biological tissue or any other region of interest 20 is shown in FIG. 1.

The region of interest 20 to be observed is illuminated by a pulsed light source L1 and in continuous mode by a light source L2. The light source L2 is for example a light source designed to illuminate an operating theater, such as a scialytic, or a source incorporated into the housing of a probe 1 forming part of the device 10.

The pulsed light source L1 (laser for example) is designed to emit a radiation for excitation of a fluorescence marker or fluorophore.

The probe 1 also comprises a camera, referred to as a "fluorescence" camera, for capturing fluorescence images (in the near infrared or, more generally, in wavelengths detected by this "fluorescence" camera). The fluorescence camera comprises a sensor sensitive to the fluorescence light emitted by the fluorophore at the surface of the region of interest 20. In other words, this fluorescence camera is equipped with at least one sensor designed to capture images in the near infrared or, more generally, in the wavelengths emitted by fluorescent markers (and notably between 700 and 900 nanometers). This sensor is also designed to capture images within other spectral bands and notably in the visible. It is also possible, according to one variant, to use a probe 1 comprising a first fluorescence camera for capturing fluorescence images (for example in the near infrared) and a second camera for capturing images in the visible.

The sensor comprises photodiodes distributed in a matrix of at least N rows and at least M columns of photodiodes. The sensor is for example a linear sensor of the CMOS (acronym for "Complementary Metal-Oxide Semiconductor") type. Furthermore, the sensor has a mode of operation of the "rolling shutter" type.

The device 10 also comprises a computer 2. The computer 2 may be a generic computer. For example, it is equipped with a 2.7 GHz Intel® Core i3 microprocessor, with a 4 GB RAM memory and with a 500 GB hard disk. The probe 1 is for example connected to the computer 2 so as to closed-loop control the operation of the probe 1, and also to record and store the images captured by each camera. With the aid of a suitable computer program, the computer 2 therefore provides:
- recording means for recording the electrical signal generated by each photodiode, the signal extracted for each photodiode being used to form one pixel on an image,
- closed-loop control means for controlling the recording means; in other words for sequentially recording the signal integrated by a group of photodiodes of the matrix, prior to extracting and recording the signal integrated by another group of photodiodes of the matrix,
- means of synchronizing the pulsed light source L1 with a sequence for integration of the signal over various groups of photodiodes; in other words means for controlling the activation and the extinction of the light source L1.

The computer 2 also allows a processing of the images obtained whether this be in the near infrared, for example, or in the visible. The device 10 also comprises means of viewing and of displaying 3 (screen) images before and/or after processing.

The probe 1 is potentially held, by means of a support arm, in a stable manner and at a constant distance from the scene comprising the region of interest 20 to be observed and studied (there may however be a slight movement of the scene owing notably to the respiration of the patient for example). However, with a high enough acquisition frequency (for example of 25 images per second), it is possible to work in "hand-held" mode with no support arm, while still avoiding artifacts.

A fluorescent tracer, or fluorophore, is injected intravenously. Alternatively, no tracer is injected and an auto-fluorescence signal is detected. The emission signal of the fluorophore is captured by the sensor of the probe 1 and is recorded.

The signal captured by each of the photodiodes of the sensor is associated with a pixel.

By way of example and in order to simplify the explanations, the invention is described making reference to groups of photodiodes arranged according to the N rows of the sensor, but these groups could just as well be organized in columns, in blocks, etc.

Figure 2:
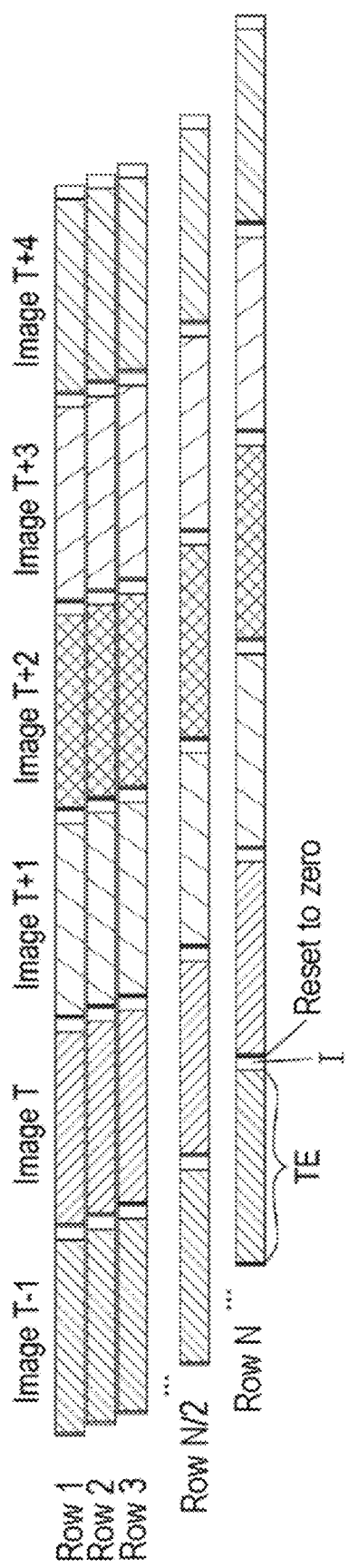
FIG. 2 shows schematically a sequence for integration of the signal extracted from the various rows of a sensor operating in "rolling shutter" mode.

As illustrated by FIG. 2, according to the example of organization of the photodiodes chosen in order to illustrate the invention, the photodiodes of the row 1 are exposed during an exposure time TE. Then, the signal generated on each photodiode of the row 1 is extracted during an interval of time I. Lastly, the photodiodes of this row are reset to zero prior to proceeding with a new acquisition (in other words: exposure, extraction of the signal and reset to zero), and so on.

Figure 3:
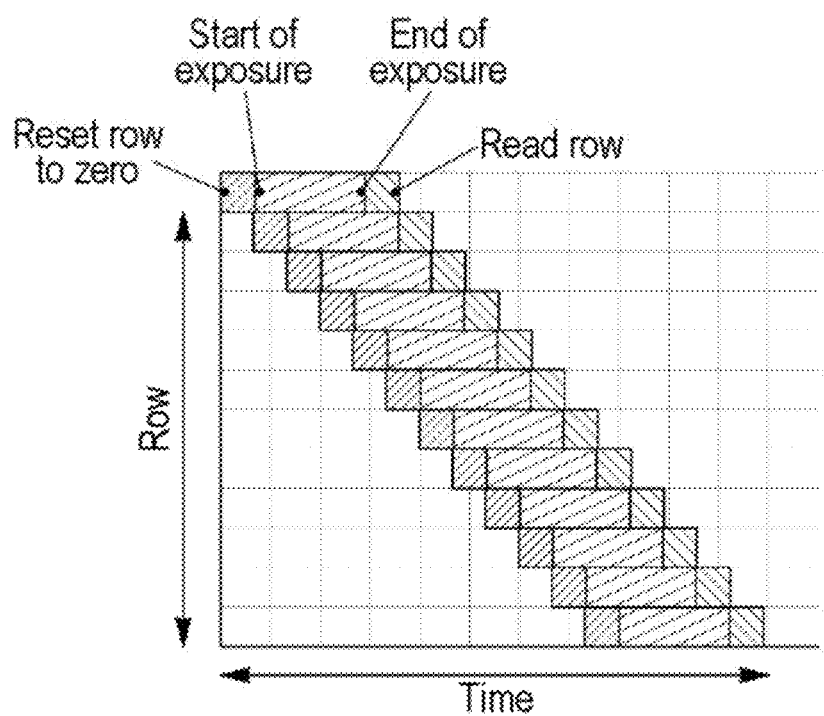
FIG. 3 shows schematically, in a manner different from the preceding figure, a sequence for integration of the signal extracted from the various rows of a sensor operating in "rolling shutter" mode.

As also illustrated by FIG. 3, the same acquisition sequence is reproduced from the row 2, the row 3, . . . the row i, . . . and from the row N, with a shift in the processing of each row corresponding notably to the interval of time needed for the extraction of the signal from the preceding row, according to the operation in "rolling shutter" mode of the sensor used for producing the fluorescence images.

In order to obtain images that each correspond to a different illumination, each of the illuminations may be synchronized with the exposure, under a given illumination, of all the rows corresponding to each of the images. In other words, the illumination is synchronized so that all the rows of photodiodes implemented for the acquisition of an image are exposed when one or more sources (for example L1+L2) are turned on and when all the rows of photodiodes implemented for the acquisition of another image (acquired later) are exposed while one or more other sources (for example L2) are on.

Figure 4:
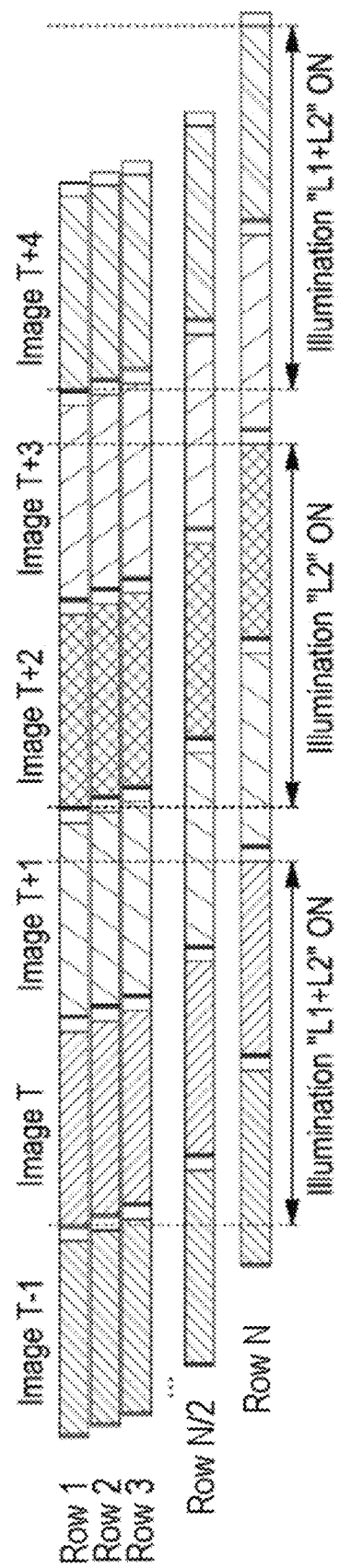
FIG. 4 shows schematically a sequence for integration of the signal extracted from the various rows of a sensor operating in "rolling shutter" mode, combined according to the prior art with periods of illumination by two types of light sources used alternately.

This is illustrated by FIG. 4. The rows of photodiodes implemented for the acquisition of an image T are exposed over a period of time long enough for them all to be exposed while the illumination L1+L2 is on. Then, the rows of photodiodes implemented for the acquisition of an image T+2 are exposed over a period of time long enough for them all to be exposed while only the illumination L2 is on.

This sequence may thus be periodically reproduced so that each image "$T_{4k}$" (with k a positive or negative integer value) corresponds to an illumination by the sources "L1+L2", whereas each image "$T_{4k+2}$" corresponds to an illumination by the source "L2". Nevertheless, according to this method, the images "$T_{2k+1}$" are never used and a pair of images, each respectively corresponding to an illumination "L1+L2" and "L2", are therefore obtained every 3 images.

For this reason, according to the invention, another method is provided allowing all the images or frames to be used. The method according to the invention also allows the rate of output of the images to be increased. The images may then be displayed at the acquisition frequency corresponding to the video frame.

According to one embodiment of the method according to the invention, the exposure time to each type of illumination (for example: first illumination with the sources L1 and L2 and second illumination with the source L2 alone) are synchronized with the acquisition sequence of at least one row of photodiodes.

This is illustrated in FIG. 5a. This figure shows schematically a sequence during which the exposure of the row N/2 with successive illuminations, alternately both by L1 and L2 (during a first time period), then by L2 only (during a second time period), is synchronized with the acquisition sequence of the signal obtained on the photodiodes of this row. In other words, the periods of illumination, respectively with a first type of illumination (for example with the two sources L1 and L2) or with a second type of illumination (for example only with the source L2), advantageously essentially corresponds to the period of exposure of the sensor. In practice, these periods of illumination may be a little longer and extend over the intervals of time I over which the signal generated on each photodiode of a row is extracted. The periods of illumination, respectively with the first type or with the second type of illumination, are for example equal to each other in duration, immediately succeed one another and are equal to the cumulation of the integration time, of the recording time of the signal acquired by each photodiode of the row of photodiodes and of the time for resetting to zero each of these photodiodes. Potentially, these periods of illumination may be even shorter or longer than the exposure time of the sensor (while however avoiding dividing or multiplying by two these periods so as not to lose too much information: for example, illumination periods too close to 20 or 80 ms for an integration period of 40 ms will be avoided).

Furthermore, these periods of illumination are advantageously synchronized in such a manner that the photodiodes of a row, in this document called reference row or group of photodiodes (for example that with index N/2 situated in the middle of the sensor) are illuminated by only one type of illumination at a time (for example either with the two sources L1 and L2, or with the source L2 alone), over the entirety of its integration time corresponding to each image. Thus, for example, the row of photodiodes of index N/2 is exposed with the first type of illumination (with the two sources L1 and L2 in the present example) for the signal corresponding to the image $T_{2k}$ and is exposed with the second type of illumination (with the source L2 in the present example) for the signal corresponding to the image $T_{2k+1}$, and so on. In other words, the means of synchronizing the activation and the extinction of the pulsed light source L1 follow a sequence consisting in turning on this light source L1 at the latest at the start of the period of integration of the reference row of photodiodes, and turning off the pulsed light source L1 at the earliest at the end of the period of integration of this same reference row of photodiodes. This sequence is reproduced, for this same reference row of photodiodes, while skipping the following period of integration of the signal.

Thus, the subtraction, pixel to pixel, of the signal extracted for each photodiode of the row of index N/2 of an image $T_{2k+1}$, from the signal of these same photodiodes of an image $T_{2k}$, allows the signal to be recovered that would have been obtained for each pixel of this row if the corresponding photodiodes had been illuminated by the source L1 alone.

More generally, one advantage of the invention resides in the possibility of generating an image resulting from a subtraction using each new image received, notably storing it in memory. The order of the members in the pixel-to-pixel subtraction depends on the index of the new image received. Thus, upon receipt of an image of even index, $T_{2k}$, the calculation is performed by subtracting from the newly received image $T_{2k}$, illuminated with the source "L1+L2" on the row of index N/2, the preceding image $T_{2k-1}$ stored in memory and illuminated with the source "L2": "$T_{2k}-T_{2k-1}$". Conversely, if the new image received is an image of odd index, $T_{2k+1}$, then the subtraction "$T_{2k}-T_{2k+1}$" is effected ($T_{2k}$ corresponding, in this case, to the image stored in memory).

It may be noted that the other rows (above and below that of index N/2) have not been illuminated, for the image $T_{2k}$, by the source L1 during the whole of its integration time, even if all the rows have been illuminated during this whole time with the source L2. The method according to the invention allows this problem to be solved.

Figure 5B:
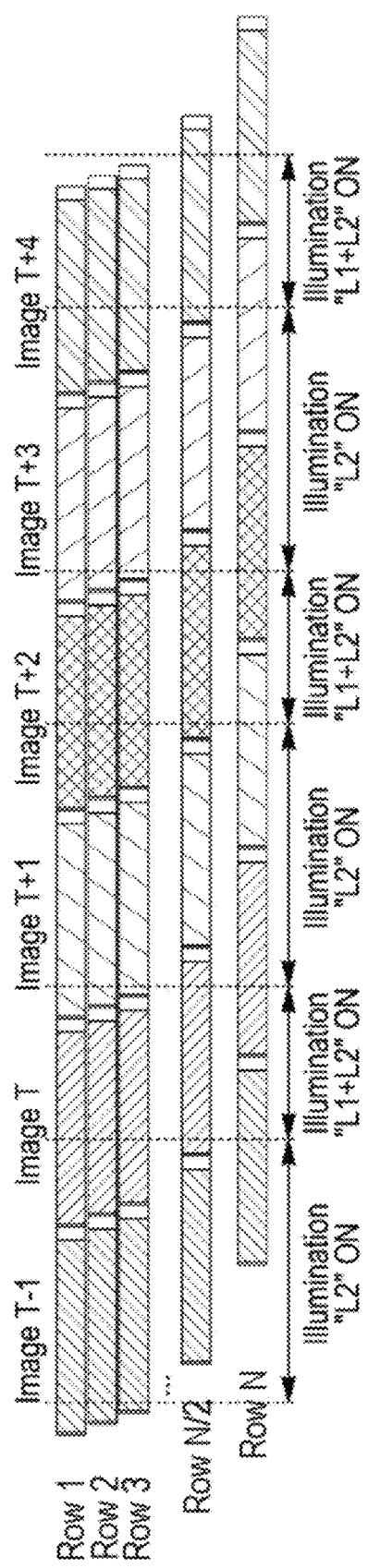
FIG. 5b shows schematically a sequence for integration of the signal extracted from the various rows of a sensor operating in "rolling shutter" mode, synchronized according to the invention with periods of illumination by two types of light sources, used alternately, the first and second periods of illumination being different from each other.

Alternatively, according to one variant illustrated by FIG. 5b, the periods of illumination are not synchronized over one particular row of photodiodes and/or are not of equal durations. This does not change the method according to the invention in its generality. Only the correction matrix will be different depending on the reference group of photodiodes chosen (for example, the correction matrix will not necessarily have the symmetry of that obtained by choosing the row of index N/2 as reference group of photodiodes).

Therefore, by generalizing the above for any row of photodiodes:

The intensity of the signal associated with the $j^{th}$ pixel (with j going from 0 up to the number of photodiodes on the row of the sensor) of the row N/2 of the image T of even index 2k is denoted $T_{2k}$ (N/2, j), and the intensity of the signal associated with the $j^{th}$ pixel of the row N/2 of the image T of odd index 2k+1, is denoted $T_{2k+1}$(N/2, j).

Even more generally speaking, the intensity of the signal associated with the $j^{th}$ pixel of the i-th row of the image T of even index 2k is denoted $T_{2k}$ (i, j) and, more precisely, the intensity of the signal associated with the $j^{th}$ pixel of the $i^{th}$ row of the image T of even index 2k, subsequent to an illumination by the source $L_k$ (k going from 1 to 2 in the present example) is denoted $T_{2k}^{Lk}$(i, j).

In a simple case where the signals received by the camera are linear, it may be considered that the intensity of the signal measured on a photodiode, when the light sources L1 and L2 are on, is equal to the linear sum of the intensity of the signal that would have been generated by this photodiode when illuminated with the light source L1 and of the intensity of the signal that would have been generated by this photodiode when illuminated with the light source L2.

Accordingly, staying with the example where the period of illumination "L1+L2" covers, or is synchronized on, the acquisition of a row of the images of even indices $T_{2k}$ and the illumination "L2" covers, or is synchronized on, the acquisition of this same row of the images of odd indices $T_{2k+1}$, the following relationships may be generalized:

$$T_{2k}(i, j) = T_{2k}^{Xi\% \cdot L1 + 100\% \cdot L2}(i, j) = X_i\% \cdot T_{2k}^{L1}(i, j) + 100\% \cdot T_{2k}^{L2}(i, j)$$

where Xi% corresponds, for the $i^{th}$ row, to the percentage of the time during which the source L1 is on, with respect to the exposure time of the sensor, for the image $T_{2k}$, and:

$$T_{2k+1}(i, j) = T_{2k+1}^{Yi\% \cdot L1 + 100\% \cdot L2}(i, j) = Y_i\% \cdot T^{L1}(i, j) + 100\% \cdot T^{L2}(i, j)$$

where Yi% corresponds, for the $i^{th}$ row, to the percentage of the time during which the source L1 is on, with respect to the exposure time of the sensor, for the image $T_{2k+1}$ (where this percentage may be different from that corresponding to the image $T_{2k}$).

Accordingly, upon receiving an image of odd index $T_{2k+1}$, pixel to pixel, the intensities associated with this image $T_{2k+1}$ are subtracted from the intensities of the preceding image $T_{2k}$ received and saved in the following manner:

$$T_{2k}(i, j) - T_{2k+1}(i, j) = (100\% \cdot T_{2k}^{L2}(i, j) + X_i\% \cdot T_{2k}^{L1}(i, j)) - (100\% \cdot T_{2k+1}^{L2}(i, j) + Y_i\% \cdot T_{2k+1}^{L1}(i, j))$$

In a reciprocal manner, upon receiving an image of even index $T_{2k}$, pixel to pixel, the intensities associated with the preceding image received and saved $T_{2k-1}$ are subtracted from the intensities of the new image $T_{2k}$, in the following manner:

$$T_{2k}(i, j) - T_{2k-1}(i, j) = (100\% \cdot T_{2k}^{L2}(i, j) + X_i\% \cdot T_{2k}^{L1}(i, j)) - (100\% \cdot T_{2k-1}^{L2}(i, j) + Y_i\% \cdot T_{2k-1}^{L1}(i, j))$$

The assumption is furthermore made that the signal extracted from a photodiode, with an illumination by the ambient light source (provided by L2), has not changed between the respective acquisitions of the images $T_{2k-1}$ and $T_{2k}$, and also between the images $T_{2k}$ and $T_{2k+1}$ (which is all the more the case the shorter the interval of time between the respective acquisitions of the images). The assumption is also made that the movements of the scene are negligible during the acquisition time of the sensor (for example 40 milliseconds).

Then:

$$100\%.T_{2k}^{L2}(i,j)=100\%.T_{2k+1}^{L2}(i,j)$$

and $$100\%.T_{2k-1}^{L2}(i,j)=100\%.T_{2k}^{L2}(i,j)$$

Similarly, the assumption is made that the signal extracted from a photodiode and corresponding to the fluorescence (caused by an illumination with the source L1) has not changed between the respective acquisitions of the images $T_{2k-1}$ and $T_{2k}$ and also between the images $T_{2k}$ and $T_{2k+1}$ (preferably, this assumption is only used for processing the signal corresponding to two consecutive images obtained over a short time), then:

$$X_i\%.T_{2k}^{L1}(i,j)=X_i\%.T_{2k+1}^{L1}(i,j)$$

and $$X_i\%.T_{2k-1}^{L1}(i,j)=X_i\%.T_{2k}^{L1}(i,j)$$

and similarly $$Y_i\%.T_{2k}^{L1}(i,j)=Y_i\%.T_{2k+1}^{L1}(i,j)$$

and $$Y_i\%.T_{2k-1}^{L1}(i,j)=Y_i\%.T_{2k}^{L1}(i,j)$$

Therefore:

$$T_{2k}(i,j)-T_{2k+1}(i,j)=X_i\%.T_{2k}^{L1}(i,j)-Y_i\%.T_{2k+1}^{L1}(i,j)=(X_i\%-Y_i\%).T_{2k}^{L1}(i,j)$$

and $$T_{2k}(i,j)-T_{2k-1}(i,j)=X_i\%.T_{2k}^{L1}(i,j)-Y_i\%.T_{2k-1}^{L1}(i,j)=(X_i\%-Y_i\%).T_{2k}^{L1}(i,j)$$

Since the illumination is synchronized with the integration time of the sensor, then each row always receives the same proportion of light from the source L1 ($X_i\%$ in the image $T_{2k}$ and $Y_i\%$ in the image $T_{2k+1}$) and hence the value $(X_i-Y_i)\%$ is fixed and given for each row of the pair of images $(T_{2k}, T_{2k+1})$ and $(T_{2k-1}, T_{2k})$:

$$(X_i\%-Y_i\%).T_{2k}^{L1}(i,j)=Z_i\%.T_{2k}^{L1}(i,j)$$

Therefore, the intensity $T_{2k}^{L1}(i,j)$ of the signal $j^{th}$ pixel of the $i^{th}$ row corresponding to the image produced by the illumination L1 alone, upon receiving an image $T_{2k+1}$ of odd index, is equal to:

$$T_{2k}^{L1}(i,j)=T_{2k+1}^{L1}(i,j)=(T_{2k}(i,j)-T_{2k-1}(i,j))/(Z_i\%)$$

and, upon receiving an image $T_{2k}$ of even index, is equal to:

$$T_{2k}^{L1}(i,j)=T_{2k-1}^{L1}(i,j)=(T_{2k}(i,j)-T_{2k-1}(i,j))/(Z_i\%)$$

The value $Z_i\%$ for each row of index i may easily be calculated when the images are obtained by illuminating a uniform surface with the source L2 in continuous mode and by illuminating this same surface with the source L1, in the form of periodic pulses (these periodic pulses are, for example as indicated hereinabove, synchronized with the acquisition of the $N/2^{th}$ row of the sensor). In this case, the ratio, pixel to pixel, between the image resulting from the subtraction $(T_{2k}(i,j)-T_{2k+1}(i,j))$ or $(T_{2k}(i,j)-T_{2k-1}(i,j))$ with the true image $T^{100\%.L1}$ obtained with the source L1 alone illuminating a uniform surface allows the various values of $Z_i\%$ to be obtained which, as indicated above, are fixed and given for each row of the pair of images $(T_{2k}, T_{2k+1})$ and $(T_{2k-1}, T_{2k})$.

Furthermore, in practice, the problem of non-uniformities of the surface may also be overcome and a test pattern such as that shown in the figures used.

If the surface is effectively uniform, or even perfectly uniform, the knowledge of this true image $T^{100\%.L1}$ may be sufficient and, in this case, the value of the intensity obtained for each pixel of the image $T^{100\%.L1}$ is normalized by the value of the maximum intensity in this same image $T^{100\%.L1}$. A normalized image $T^{100\%.L1}$ is obtained and this normalized image is used to calculate the values $Z_i\%$.

However, more generally, in order to be able to use a test pattern or a surface which is non-uniform, it is preferable to use a true image corrected for the non-uniformities. For this purpose, at least one image of this surface (for example, of a test pattern) is acquired with the source L1 alone, in continuous mode over a certain period of time (for example during the entirety of the exposure time of the sensor) and at least one other image of this same surface with the source L1 in pulsed mode over this same period of time (for example during the entirety of the exposure time of the sensor). It may be advantageous to produce several images, whether this be with the source L1 in continuous mode and/or this be with the source L1 in pulsed mode, in order to generate an average and thus to reduce the errors linked to a random noise (such as a Poisson noise for example). The ratio, pixel by pixel, of the value of the intensity obtained in the image resulting from the pulsed illumination L1, over the value of the intensity obtained in the image resulting from the illumination L1 in continuous mode, allows an image $T^{100\%.L1}$ to be obtained that is also normalized and this normalized image to be used for calculating the values $Z_i\%$.

Figure 6:
FIG. 6 corresponds to an image $T_{2k}$ (with k a positive or negative integer value), obtained by illumination of a uniform surface, in the main illuminated by "L1+L2"
Figure 7:
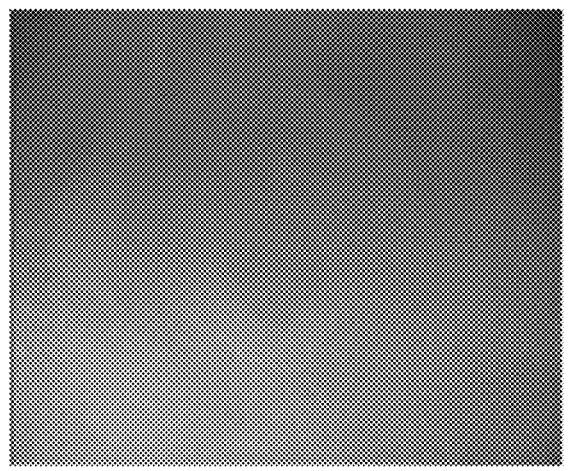
FIG. 7 corresponds to an image $T_{2k+1}$ (with k a positive or negative integer value), obtained by illumination of a uniform surface, in the main illuminated by "L2"
Figure 8:
FIG. 8 corresponds to an image resulting from the subtraction of the image $T_{2k+1}$ from the image $T_{2k}$.

Thus, when an image $T_{2k}^{Xi\%.L1+100\%.L2}(i,j)$, such as shown in FIG. 6, together with an image $T_{2k+1}^{Yi\%.L1+100\%.L2}(i,j)$ such as shown in FIG. 7, has been recorded, these two images may be subtracted. This results in an image such as that illustrated in FIG. 8.

If the dynamic range of the sensor is linear and if the images have not undergone a gamma correction, then the values of the signal respectively associated with each pixel may be directly subtracted, pixel to pixel, from each other. Subsequently, the ratio of the image resulting from the subtraction $T_{2k}-T_{2k+1}$, therefore which must correspond to an image obtained with an illumination by the source L1 alone, over the true image obtained by illuminating a uniform surface with the source L1 alone, $T^{100\%.L1}$ (normalized).

The values $Z_i\%$ are obtained for each row of index i (in other words, reasoning by rows). In such a manner as to perform a read by blocks or groups of pixels potentially distributed in a random manner for example, the calculations may be even more generalized by reasoning by pixel and calculating a correction matrix $Cr(i,j)$ such that:

$$Cr(i,j)=(T_{2k}^{Xi\%.L1+100\%.L2}(i,j)-T_{2k+1}^{Yi\%.L1+100\%.L2}(i,j))/T^{100\%.L1}(i,j)$$

A first calibration step is then carried out by the acquisition of a series of images of a surface, advantageously uniform, with the source L1 illuminating in a pulsed manner and with the source L2 off (the illumination by this source L2 would not in any case have any effect on the following calculation since it is constant). The following $$(T_{2k}^{Xi\%.L1+100\%.L2}(i,j)-T_{2k+1}^{Yi\%.L1+100\%.L2}(i,j))$$

may then be calculated.

A second calibration step is also carried out by the acquisition of a series of images of a uniform surface, with the source L1 illuminating in a continuous manner and with the source L2 off. The following $$T^{100\%.L1}(i,j)$$

may then be calculated.

The ratio of these two measurements (with L1 pulsed and L2 at 0) and (L1 in continuous mode and L2 at 0) allows the correction matrix Cr(i, j) to be determined.

In other words, the correction matrix is readily obtained by means of calibration measurements which may be performed at the factory prior to delivering the device or at any moment during its use by placing the probe facing a substantially uniform element (which could be fluorescent). Taking a ratio of the values measured by calibration allows potential non-uniformities of the surface of the calibration target, together with the potential variations in efficiency of the photodiodes, to be corrected.

In order for the result of the calibration to be even more precise, it is possible to calculate an average of the signal obtained on each pixel over several images of the same type before performing the subtraction, then the division indicated hereinabove. In other words, the images $T_{2k}^{Xi\%.L1+100\%.L2}(i, j)$ and $T_{2k+1}^{Yi\%.L1+100\%.L2}(i, j)$ in the calculation described hereinabove, are images formed from an average over several images (for example the image $T_{2k}$ corresponds to an average calculated on the images 2,4,6, 8,10 and the image $T_{2k+1}$ to an average calculated on the images 3,5,7,9,11). These averages allow the influence of the noise in the images to be reduced. Similarly, the image $T^{100\%.L1}(i, j)$ may correspond to an average.

In general, the dynamic behavior of the sensors (CMOS or CCD) is non-linear because a correction for gamma (or contrast factor) is applied.

In this case, it is necessary to firstly de-correct the gamma so as to revert to a linear dynamic signal behavior prior to subtracting $T_{2k+1}^{Yi\%.L1+100\%.L2}(i, j)$ from $T_{2k}^{Xi\%.L1+100\%.L2}(i, j)$. The image $T_{2k}^{Xi\%.L1+100\%.L2}(i, j)$ de-corrected for the gamma is denoted $^{g}T_{2k}^{Xi\%.L1+100\%.L2}(i, j)$ A correction matrix Cr(i, j) may then be calculated such that:

$$Cr(i, j) = (^{g}T_{2k}^{Xi\%.L1+100\%.L2}(i, j) - ^{g}T_{2k+1}^{Yi\%.L1+100\%.L2}(i, j)) / ^{g}T^{100\%.L1}(i,j)$$

Figure 9:
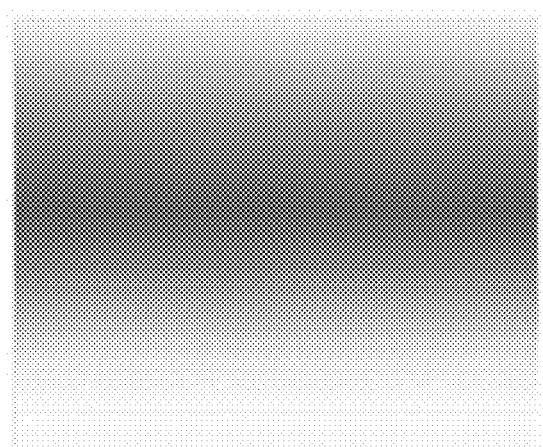
FIG. 9 illustrates one example of a correction matrix for one integration of the signal per row of photodiodes.
Figure 10:
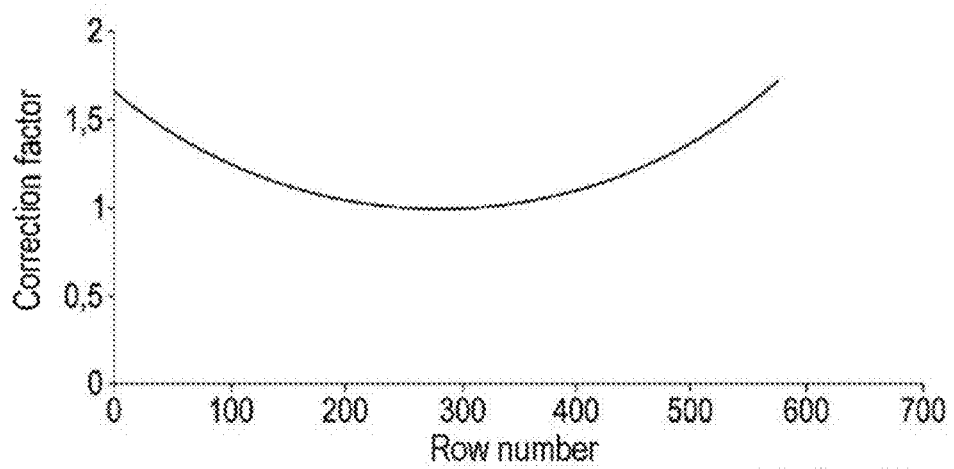
FIG. 10 shows one example of a correction factor, as a function of the index of the row to which it is applied, for one integration of the signal per row of photodiodes.

Subsequent to this calculation the correction matrix shown in FIG. 9 is, for example, obtained. The correction value as a function of the index of the row may also be represented as in FIG. 10.

By considering a sensor as linear when not applying any correction for gamma, the correction matrix Cr(i, j) therefore corresponds to the matrix to be applied in a multiplicative fashion after each subtraction $T_{2k}-T_{2k+1}$ upon receiving an image of odd index $T_{2k+1}$ and $T_{2k}-T_{2k-1}$ upon receiving an image of even index $T_{2k}$, in order to recover the information for $T_{2k}^{100\%.L1}(i, j)$:

$$T_{2k}^{100\%.L1}(i, j) = (T_{2k}^{Xi\%.L1+100\%.L2}(i, j) - T_{2k+1}^{Yi\%.L1+100\%.L2}(i, j)) * Cr(i, j)$$

In the case of a non-linear sensor, the equation becomes:

$$^{g}T_{2k}^{100\%.L1}(i, j) = (^{g}T_{2k}^{Xi\%.L1+100\%.L2}(i, j) - ^{g}T_{2k+1}^{Yi\%.L1+100\%.L2}(i, j)) * Cr(i, j)$$

In order to bring the image $^{g}T_{2k}^{100\%.L1}(i, j)$ back into the reference frame of the camera in which a correction for gamma is applied, the image $^{g}T_{2k}^{100\%.L1}(i, j)$ must be corrected by the inverse gamma in order to obtain the image $T_{2k}^{100\%.L1}(i, j)$:

$$T_{2k}^{100\%.L1}(i, j) = ^{g'}(^{g}T_{2k}^{100\%.L1}(i, j))$$

Figure 11A:
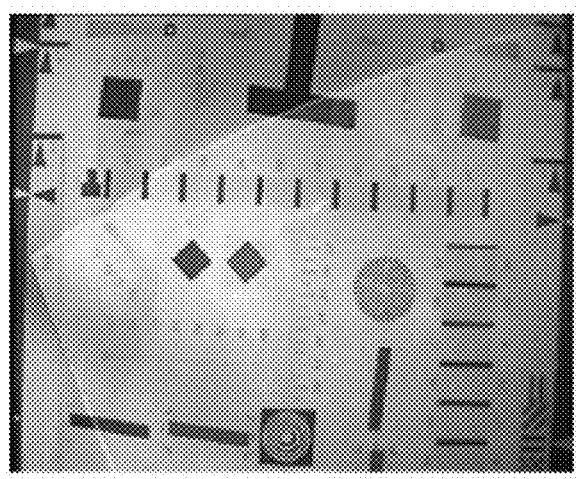
FIG. 11a shows an image $T_{2k}$ from one example of a pair of successive images $T_{2k}$ and $T_{2k+1}$.

FIGS. 11a) to 11d) illustrate the result of the subtraction operation explained hereinabove, when a periodic pulsed illumination L1 is superimposed onto a continuous illumination L2.

FIG. 11a) corresponds to an image $T_{2k}^{Xi\%.L1+100\%.L2}(i, j)$.

Figure 11B:
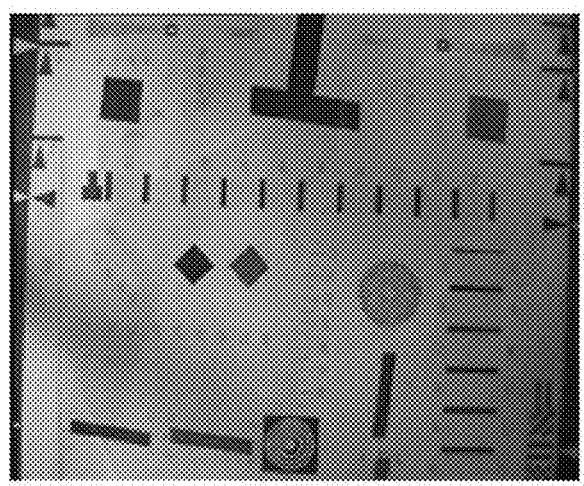
FIG. 11b shows an image $T_{2k+1}$ from one example of a pair of successive images $T_{2k}$ and $T_{2k+1}$.

FIG. 11b) corresponds to an image $T_{2k+1}^{Yi\%.L1+100\%.L2}(i, j)$.

Figure 11C:
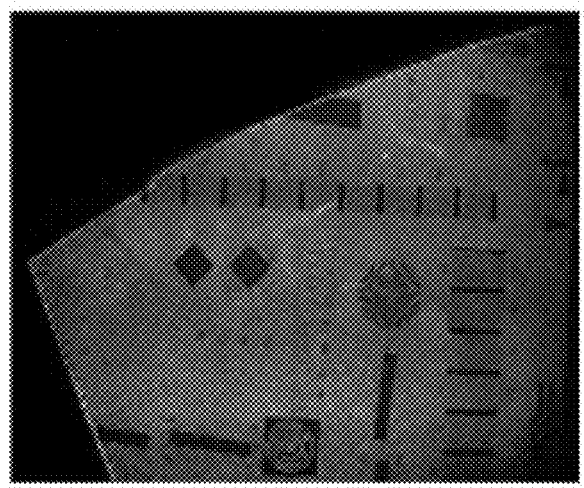
FIG. 11c shows the image calculated in accordance with the method according to the invention, starting from the images shown in FIGS. 11a and 11b, before correction by means of a correction matrix.

FIG. 11c) corresponds to the result of the subtraction $$^{g}T_{2k}^{Xi\%.L1+100\%.L2}(i, j) - ^{g}T_{2k+1}^{Yi\%.L1+100\%.L2}(i, j)$$

but before correction by means of the correction matrix.

Figure 11D:
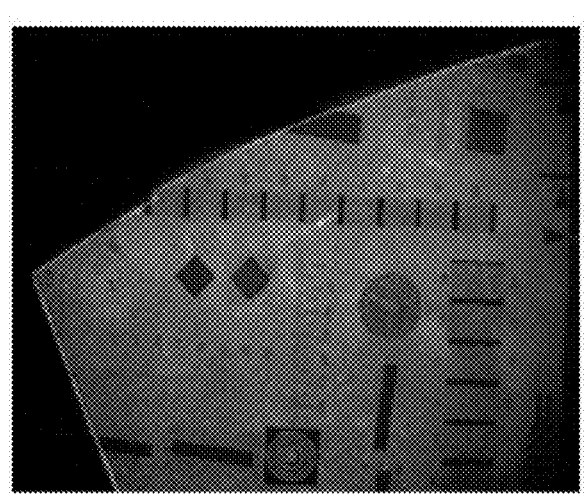
FIG. 11d shows the image calculated in accordance with the method according to the invention, starting from the images shown in FIGS. 11a and 11b, after correction by means of a correction matrix.

FIG. 11d) corresponds to a calculated image $T_{2k}^{100\%.L1}(i, j)$.

Figure 11E:
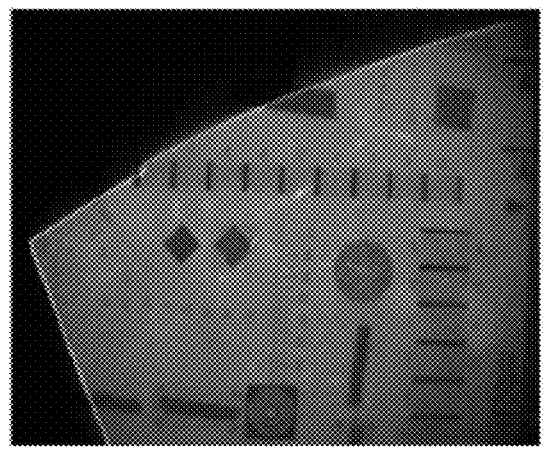
FIG. 11e shows, for comparison, the real image corresponding to the calculated image shown in FIG. 11d.

FIG. 11e) shows, by way of a comparison, the true image obtained with an illumination L1 turned on in continuous mode. There is no significant difference between the image $T_{2k}^{100\%.L1}(i, j)$ resulting from the calculation (FIG. 11d) and the true image (FIG. 11e).

Figure 12:
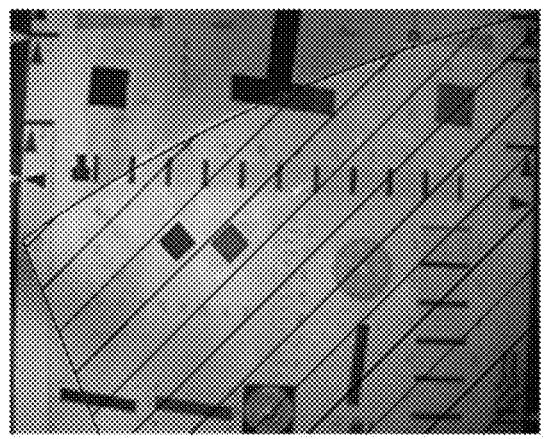
FIG. 12 shows one example of a superposition, onto a contextual image, of an image in transparency mode, such as that shown in FIG. 11c, after colorizing the latter.

FIG. 12 shows one possible example of a calculated image $T_{2k}^{100\%.L1}(i, j)$, corresponding to a fluorescence signal such as it would be detected with only the source L1 turned on, and superimposed on the image $T_{2k+1}^{Yi\%.L1+100\%.L2}(i, j)$. The image $T_{2k+1}^{Yi\%.L1+100\%.L2}(i, j)$ is chosen here as contextual image, but more generally, another suitable image could be chosen to provide a contextual image. For example, an image corresponding to an illumination with the source L2 alone could be calculated and superimposed onto the latter, the image calculated, corresponding to a fluorescence signal such as it would be detected with only the source L1 turned on. In this figure, the hatched area corresponds to an area displayed in reality in color (for example green) and in transparency mode on a background image providing the context and corresponding to the image $T_{2k+1}^{Yi\%.L1+100\%.L2}(i, j)$.

It may be noted that the method explained hereinabove may be applied with a synchronization of the periodic pulses of the light L1 on rows other than the central row of the sensor of index N/2. In this case, the correction profile (FIG. 10) will not be centered and the corrections to be applied could be greater on one of the two borders of the image.

Furthermore, under certain conditions (for example with a colorized fluorescence image and superposition of the latter in transparency mode on a contextual image), it is possible that some weak fluorescence signals are not or hardly visible. In this case, the method according to the invention will advantageously comprise a calculation step designed to increase the intensity of the signal to be displayed, over a certain range of values of the latter (in practice, for the lower values of this signal).

Figure 13:
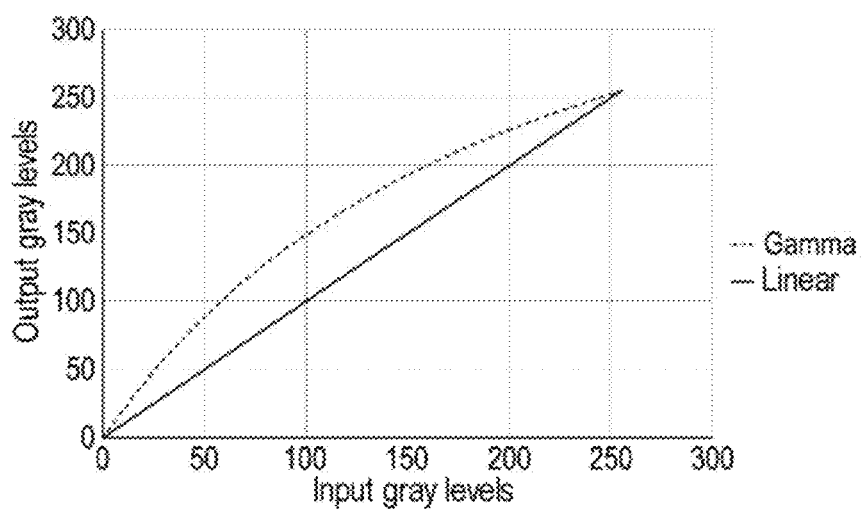
FIG. 13 shows schematically functions that may be used to enhance the brightness of certain pixels on a displayed image.

For example, a gamma correction may be applied as shown in FIG. 13. This correction has the effect of increasing all the values of the signal, but with a more pronounced increase for the low values of the latter.

Figure 14:
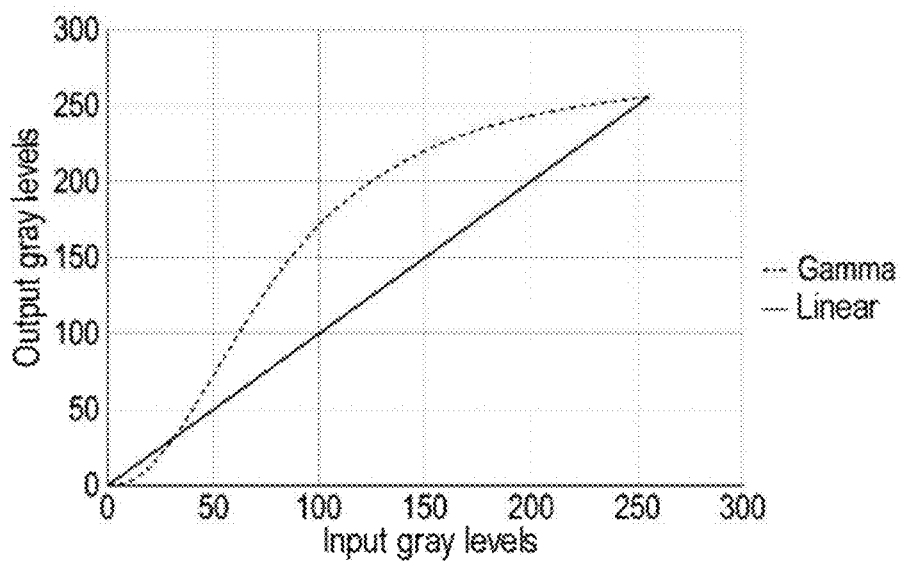
FIG. 14 shows schematically functions that may be used to enhance the brightness of certain pixels on a displayed image.

According to another example, a non-linear correction may be applied of the type of that shown in FIG. 14 (in the legend of this figure, "Gamma" is mentioned, but the latter must not be confused with the "gamma" mentioned hereinabove; this "S-shaped" curve effectively corresponds to a "Look-up-Table". This correction has the effect of more particularly increasing values of the signal which do not correspond to the lower values and which are likely to correspond to the background noise.

Figure 15:
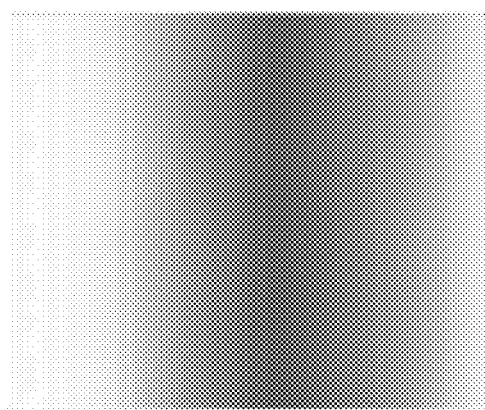
FIG. 15 illustrates one example of a correction matrix for a linear integration of the signal for an extraction of the signal from the photodiodes along columns.

The correction function does not necessarily, as in the example presented hereinabove, depend on the index of the row in which a photodiode is situated. It depends more on the time taken for the integration on a given photodiode to be carried out. Thus, according to one variant of the method described hereinabove, the integration of the signal on the photodiodes of the sensor is not carried out row by row, but column by column and in a linear fashion. Only the correction matrix is modified. Instead of taking the form of that in FIG. 9, it may then take the form of that in FIG. 15 for example.

Figure 16:
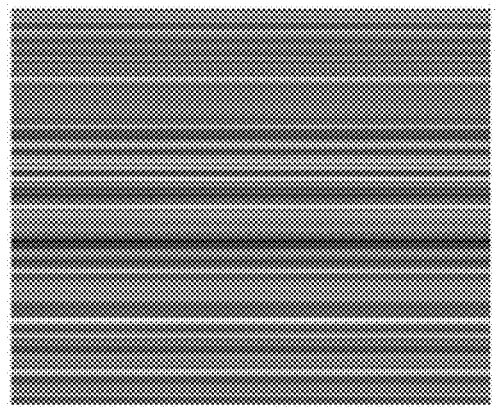
FIG. 16 illustrates one example of a correction matrix for a non-linear integration of the signal for an extraction of the signal from the photodiodes along rows.
Figure 17:
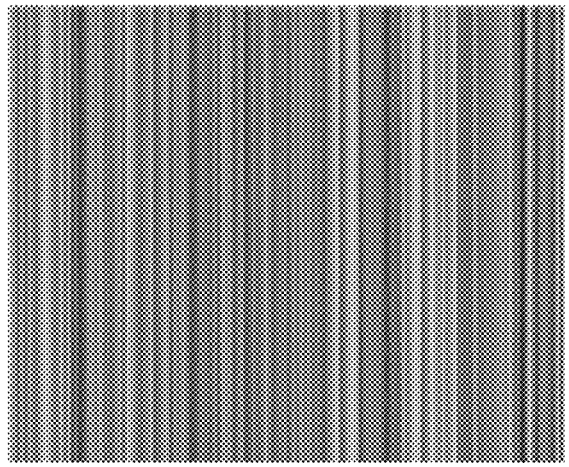
FIG. 17 illustrates one example of correction matrix for a non-linear integration of the signal for an extraction of the signal from the photodiodes along columns.

Or alternatively, the integration of the signal on the photodiodes of the sensor may be carried out over a specific time, but non-linear, with respect to the index of the row or of the column in question. The correction matrix may then take the form of that in FIG. 16 or 17, respectively.

Figure 18:
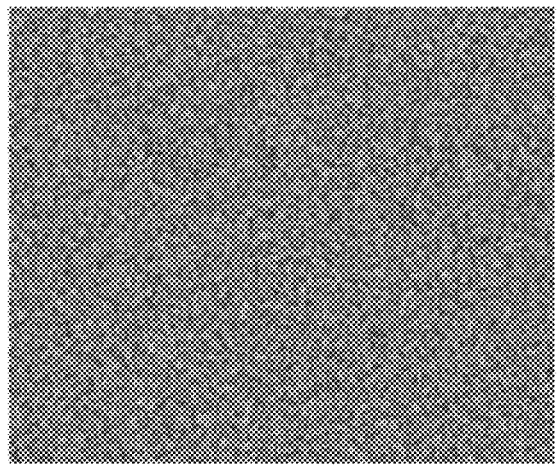
FIG. 18 illustrates one example of correction matrix for a linear integration of the signal for an extraction of the signal from the photodiodes by photodiode.

The integration of the signal on the photodiodes of the sensor may be carried out over a specific time for each photodiode or block of photodiodes, but in a non-linear fashion with respect to the position of the photodiode in a row or a column. The correction matrix may then take the form of that in FIG. 18.

One example of implementation of the method according to the invention is described hereinbelow in relation to FIG. 19.

According to this example, the method comprises:

A preliminary calibration step (not shown) for determining the correction matrix Cr(i, j), as explained hereinabove.

A step 100 or 100bis, during which the sensor is exposed to the light reflected or emitted at the surface of the region of interest, while this region is illuminated periodically alternately either with the sources L1 and L2 turned on at the same time, or with only the source L2 turned on. In practice, the source L2 illuminates the region of interest in continuous mode, whereas the source L1 illuminates the region of interest with a periodic pulsing and is superimposed on the illumination by the source L2. During this step 100 or 100bis, the signal integrated by the photodiodes of the sensor is extracted by group of photodiodes, the period of integration for at least one group of photodiodes, referred to as reference group, being synchronized with the periodic pulsing of the illumination by the source L1 (superimposed on the continuous illumination by the source L2). As mentioned hereinabove, a group of photodiodes may be organized in a row, or in a column, or in a block, etc. It will be noted that a group of photodiodes may potentially only comprise one photodiode. In the example chosen hereinabove for explaining the type of calculation implemented in accordance with the method according to the invention, a group of photodiodes corresponds to a row of photodiodes and the row of index N/2 is chosen as reference group.

At the step 100 and 100bis, the images $T_{2k}$ and $T_{2k+1}$ are stored in memory, in the form of matrices $T_{2k}^{Xi\%.L1+100\%.L2}(i, j)$ and $T_{2k+1}^{Yi\%.L1+100\%.L2}(i, j)$ (with k a positive or negative integer value), with a view to a processing allowing the matrix $T_{2k}^{100\%.L1}(i, j)$ of an image to be determined such as would have been obtained with an illumination by the source L1 alone.

Figure 19:
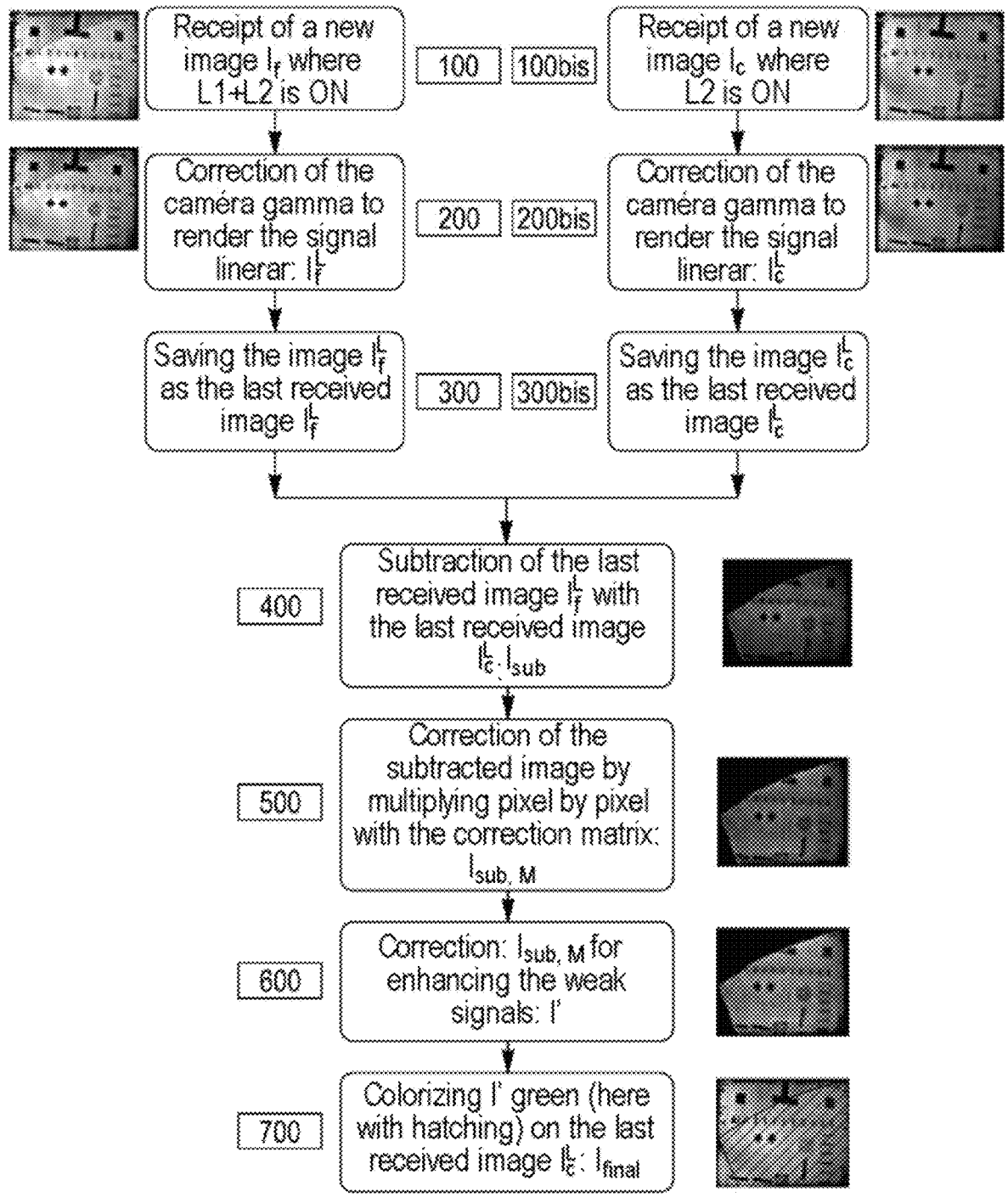
FIG. 19 shows schematically one example of a flow diagram for the implementation of the method according to the invention.

It may be noted that, despite the use of a sensor operating in "rolling shutter" mode, there is no significant deformation of the images attached to the flow diagram in FIG. 19.

At the steps 200 and 200bis, each of these matrices is corrected for the gamma (and potentially for a vignetting) in order to render the signal linear. In other words, after these steps have been applied the signal corresponding to each pixel is proportional to the quantity of light received by the corresponding photodiode. Matrices ${}^gT_{2k}^{Xi\%.L\,1+100\%.L\,2}(i, j)$ and ${}^gT_{2k+1}^{Yi\%.L\,1+100\%.L\,2}(i, j)$.

At the steps 300 and 300bis, each of these matrices ${}^gT_{2k}^{Xi\%.L1+100\%.L2}(i, j)$ and ${}^gT_{2k+1}^{Yi\%.L\,1+100\%.L\,2}(i, j)$ is respectively saved as the last image received, prior to carrying out, at the step 400, the subtraction, pixel to pixel, ${}^gT_{2k}^{Xi\%.L\,1+100\%.L\,2}(i, j) - {}^gT_{2k+1}^{Yi\%.L\,1+100\%.L\,2}(i, j)$.

At the step 500, the image resulting from the subtraction operation carried out at the preceding step undergoes a multiplication, pixel to pixel, with the correction matrix Cr(i, j).

Potentially, a step 600 allows certain values of the signal to be increased in order to enhance, as explained hereinabove, the intensity of the color displayed on the pixels corresponding to these values (in practice, either the gamma of the sensor may be re-applied, or a gamma different from that of the camera is applied in order to further enhance certain weaker signals, or any other look-up-table is applied).

At the step 700, the image obtained at the step preceding is colorized and displayed in transparency mode onto a background image (corresponding to the matrix $T_{2k}^{Xi\%.L1+100\%.L2}(i, j)$ obtained with an illumination combining the sources L1 and L2).

Each of the steps presented hereinabove is advantageously implemented by means of a computer program.

Generally speaking, the method according to the invention notably offers the following advantage. The combination of the protocol for synchronizing the pulsed light exciting at least one fluorescent marker, with the operation in "rolling shutter" mode of the sensor, with the application of a suitable correction factor allows the use of the information accessible by fluorescence imaging to be optimized. Indeed, the use of a sensor in "rolling shutter" mode already allows the blanking time of the photodiodes to be shortened, but furthermore, as explained hereinabove, the method according to the invention allows no image to be lost. Each new image corresponding to an exposure under a pulsed illumination is calculated at the rate of the image acquisition. This results in a very good fluidity of the images (each calculated image is refreshed while conserving the same number of images per second as that provided by the camera). Furthermore, by analyzing each new image, the time delay that exists between two images is limited (and hence the artifacts that may be due to the modifications in illumination or to the movement of the camera or of the scene are limited).

Generally speaking, the method according to the invention notably allows:

an image or a set of images taken with an illumination A to be superimposed onto an image or a set of images taken with an illumination B;

information present on an image or a set of images taken with an illumination A to be corrected and/or improved with the aid of an image or a set of images taken with an illumination B; indeed, biological tissues may for example be illuminated with an illumination in the near infrared A (with A that does not include B) in order to provide contextual information and information on absorption of the biological tissues in this range of wavelengths; by adding a pulsed illumination B in a range of wavelengths that excites a fluorescent tracer, the information on the fluorescence of the tracer may be determined; by making the assumption that the information on absorption of the biological tissues at the wavelengths of the illumination A is close to that resulting from an illumination B, the information on the fluorescence may be corrected by applying a correction factor to it as a function of the absorption of the biological tissues, this correction factor having been obtained from the images resulting from the illumination A;

a real-time multi-spectral imaging to be offered by allowing the emission due to an illumination A to be dissociated with respect to that due to an illumination B which has other wavelengths than that of the illumination A (the illuminations A and/or B not necessarily being in the infrared and/or being adapted to applications other than fluorescence imaging).

The invention claimed is:

1. A method that comprises using an apparatus to carry out imaging, wherein the apparatus comprises a sensor, a recorder, a first controller, first and second light sources, and a second controller, wherein the sensor comprises a matrix of photodiodes, wherein the first and second light sources illuminate a region-of-interest, wherein the method comprises using the recorder to record an electrical signal generated by at least one of the photodiodes, wherein the signal is used to define the brightness of a pixel on an image, using the first controller to carry out closed-loop control of the recorder for sequentially recording a signal generated by a group of photodiodes of the matrix before recording a signal generated by another group of photodiodes of the matrix, each of the groups of photodiodes comprising at least one photodiode, wherein a set that comprises the groups of photodiodes allows an image of the region-of-interest to be reconstructed, using the second controller to control activation of the first light source over a first time-period and extinction of the first light source over a second time-period, the second time-period succeeding the first time-period, for each photodiode of at least one group of photodiodes from the matrix, subtracting a second value from a first value, wherein the second value corresponds to a signal recorded during the second time-period for the photodiode and the first value corresponds to a signal recorded during the first time-period for the photodiode, determining a correction factor based on calibration measurements, and applying the correction factor to at least one value selected from the group consisting of the first value, the second value, and the result of having subtracted the second value from the first value, wherein during the calibration measurements first and second images are formed, wherein the first image is an image of a surface that is constantly reflecting light emitted by a calibration light source that emits in continuous mode throughout the sensor's exposure time, wherein the second image is an image of a surface that is constantly reflecting light emitted by the same calibration light source while the calibration light source emits light periodically over the first time-period, and wherein the period with which the calibration light source emits light periodically is the sum of the first and of the second time-period.

2. The method of claim 1, further comprising selecting the calibration light source to be the first light source.

3. The method of claim 1, further comprising selecting the calibration light source to be a light source other than the first light source.

4. The method of claim 1, wherein determining the correction factor comprises determining the correction factor using the value of the intensity of the signal measured for the photodiode for an image obtained by illuminating a fluorescent surface with the first light source alone.

5. The method of claim 1, wherein determining the correction factor comprises determining the correction factor based at least in part on an interval of time that passes between recording signals generated by a reference group and recording signals generated by a group to which the photodiode belongs.

6. The method of claim 1, further comprising carrying out the calibration measurements before recording the signals generated by the photodiodes during the first and second time-periods.

7. The method of claim 1, wherein each group corresponds to a row of photodiodes within the matrix and wherein the correction factor Cr(i, j) for the signal obtained from a photodiode situated on the row i and the column j is a function of the form $$Cr(i, j) = (T_{2k}^{Xi\%.L1+100\%.L2}(i, j) - T_{2k+1}^{Yi\%.L1+100\%.L2}(i, j))/T^{100\%.L1}(i, j)$$

wherein $T_{2k}^{Xi\%.L1+100\%.L2}(i, j)$ is the intensity of the measured signal corresponding to the photodiode of the $i^{th}$ row and the $j^{th}$ column for an image $T_{2k}$ obtained by illuminating the region-of-interest with a percentage $X_i\%$ of the exposure time to the first light source, and 100% of the exposure time to the second light source, wherein $T_{2k+1}^{Yi\%.L1+100\%.L2}(i, j)$ is the intensity of the measured signal, corresponding to the photodiode of the $i^{th}$ row and the $j^{th}$ column, for an image $T_{2k+1}$ obtained by illuminating the region-of-interest with a percentage $Y_i\%$ of the exposure time to the first light source, and 100% of the exposure time to the second light source, and wherein $T^{100\%.L1}(i, j)$ is the intensity of the signal measured for the photodiode of the $i^{th}$ row and the $j^{th}$ column for an image obtained by illuminating a uniform surface during the entirety of the exposure time of the sensor with the first light source alone.

8. The method of claim 7, further comprising carrying out a gamma de-correction before subtracting $T_{2k+1}^{Yi\%.L1-100\%.L2}(i, j)$ from $T_{2k}^{Xi\%.L1+100\%.L2}(i, j)$.

9. The method of claim 1, wherein applying the correction factor comprises applying the correction factor to the result of having subtracted the second value from the first value.

10. The method of claim 1, wherein applying the correction factor comprises applying the correction factor to the first value.

11. The method of claim 1, wherein applying the correction factor comprises applying the correction factor to the second value.

12. The method of claim 1, further comprising causing the second time-period to be one that immediately succeeds the first time-period.

13. The method of claim 1, further comprising periodically exposing a group of photodiodes with an exposure time, wherein the exposure time equals the first time-period.

14. The method of claim 1, further comprising choosing a group of photodiodes to be a reference group, exposing the reference group for the entirety of the first time-period and, after having done so, exposing the reference group for the entirety of the second time-period.

15. The method of claim 1, further comprising choosing a group of photodiodes to be a reference group, wherein choosing the group comprises choosing a group that spans the middle of the sensor.

16. The method of claim 1, wherein a third time-period corresponds to the sum of a first time-interval, a second time-interval, and a third time-interval, wherein the third time-period is selected from the group consisting of the first time-period and the second time-period, wherein the first time-interval is an exposure time of the photodiodes of the group of photodiodes to a third light source, the third light source being selected from the group consisting of the first light source and the second light source, wherein the second time-interval is a recording time for recording the signal acquired by each photodiode in said group, and wherein the third time-interval is a time interval required for resetting each photodiode of said group.

17. An apparatus comprising a fluorescence imaging device specially designed for the implementation of the method of claim 1, wherein said device comprises a camera, a light source, a synchronizer, and a processor, wherein said camera operates in a rolling-shutter mode of operation having a refresh frequency, wherein said camera comprises a sensor comprising groups arranged in a matrix, each group comprising at least one photodiode, wherein said photodiodes are sensitive to a range of wavelengths, wherein said light source is a pulsed light source configured to excite a fluorophore in a region-of-interest, wherein said synchronizer is configured for synchronizing the activation and the extinction of the pulsed light source with a sequence for integrating the signal extracted from the groups, wherein, for each photodiode of at least one group, said processor is configured to generate a third value by subtracting a second value from a first value and to apply a correction factor to a value selected from the group consisting of the first value, the second value, and the third value, wherein said first value corresponds to a signal recording during a first time-period for said photodiode, wherein said second value corresponds to a signal recorded during a second time-period for said photodiode, wherein said synchronizer is configured to synchronize the activation and the extinction of the light source with an on/off frequency equal to half of the refresh frequency, and wherein the range of wavelengths extends at least between 700 nanometer and 900 nanometers.

18. The apparatus of claim 17, wherein said synchronizer is configured to execute a sequence that comprises turning on said light source no later than the start of an integration period of a group of photodiodes and turning off said light source no earlier than the end of the period of integration of said group of photodiodes, wherein said synchronizer is further configured reproduce said sequence for said group of photodiodes with a frequency equal to half of said refresh frequency.

19. A manufacture comprising a non-transitory computer-readable medium having encoded thereon instructions that, when executed by a processor, execute the method recited in claim 1.

* * * * *